(12) United States Patent
Aubuchon et al.

(10) Patent No.: US 7,184,439 B1
(45) Date of Patent: Feb. 27, 2007

(54) METHOD AND SYSTEM FOR OPTIMIZING SWITCH-TRANSACTION PROCESSING IN A TELECOMMUNICATIONS NETWORK

(75) Inventors: Kenneth James Aubuchon, Lenexa, KS (US); Robert Alan Ewy, Lecompton, KS (US); Kevin Michael Fallis, Overland Park, KS (US); Ronald Christopher Harris, Topeka, KS (US); Daniel Christian Johnson, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1067 days.

(21) Appl. No.: 10/134,810

(22) Filed: Apr. 29, 2002

(51) Int. Cl.
*H04L 12/28* (2006.01)
*H04L 12/56* (2006.01)
*H04J 1/16* (2006.01)
*H04L 1/00* (2006.01)

(52) U.S. Cl. ............... 370/395.1; 370/229; 370/235; 370/236.1; 370/236.2

(58) Field of Classification Search ............. 370/395.1
See application file for complete search history.

(56) References Cited

U.S. PATENT DOCUMENTS

| | | | |
|---|---|---|---|
| 5,982,869 A * | 11/1999 | Lozano et al. ......... 379/220.01 |
| 6,625,602 B1 * | 9/2003 | Meredith et al. ............... 707/8 |
| 6,718,361 B1 * | 4/2004 | Basani et al. ............... 709/201 |
| 6,748,447 B1 * | 6/2004 | Basani et al. ............... 709/244 |
| 2002/0099833 A1 * | 7/2002 | Steely et al. ................ 709/228 |
| 2003/0005172 A1 * | 1/2003 | Chessell ..................... 709/316 |

\* cited by examiner

*Primary Examiner*—Huy D. Vu
*Assistant Examiner*—Blanche Wong (57) ABSTRACT

A method, system and article for optimizing the processing of switch transactions and updating multiple switches of a communications network based on a single transaction is provided. When a switch is backlogged with transactions beyond a threshold quantity, those transactions heading to the backlogged switch are grouped together, placed in a file and sent to the switch as a single transaction. Some of the batched individual transactions may be dependent upon other switches as well. The present invention accommodates for multiple dependencies and responds with a success notification only when all portions of the original transaction are complete. In another aspect of the invention, where multiple switches require updating, such updating can be accomplished with only a single transaction. Switch identification information is included with the transaction permitting multiple switches to be updated from the single transaction.

23 Claims, 9 Drawing Sheets

METHOD AND SYSTEM FOR OPTIMIZING SWITCH-TRANSACTION PROCESSING IN A TELECOMMUNICATIONS NETWORK

STATEMENT REGARDING FEDERALLY SPONSORED RESEARCH OR DEVELOPMENT

Not applicable

CROSS-REFERENCE TO RELATED APPLICATIONS

Not applicable

TECHNICAL FIELD

The present invention relates to computing network systems, such as a Telecommunications Network. More particularly, the invention relates to a system and method for automatically updating multiple switches of a communications network based on a single transaction and optimizing the processing of switch transactions.

BACKGROUND OF THE INVENTION

A Telecommunications Network is typically comprised of several switches. As will be explained below in greater detail, switches are used to establish pathways between callers and contain tables of data forming a relational database. As demand for Telecommunications Network services increases, so too does the processing requirements of switch transactions. It is becoming common for multiple switches to service a single calling region. This means that an originating call could be processed by one of several originating switches.

As more entities enlist the services provided by telecommunications companies, the likelihood of fraudulent use of such services increases as well. The probability of innocent mistakes by customers also increases. For instance, as more people sign up for long-distance service, the number of people eventually canceling service or changing carriers also increases. When a person cancels long-distance service, that person should no longer be permitted to access the long-distance network. If the caller is serviced in an area with multiple switches, then it is possible that multiple switches will have to be updated with new data to block the caller's call. In the past if five switches need to be updated, then five separate transactions were required to accomplish the updates. There is a need to be able to update many switches in response to a single transaction.

At any give time, a switch may have many transactions to process. Processing these transactions efficiently and timely is desirable to maintain bandwidth on the Telecommunications Network. One method of efficiently processing switch transactions is to batch the transactions into a file and present the file to the switch as a single transaction to process. This method greatly decreases the time of processing individual switch transactions. However, now that transactions can be sent, or be dependent upon multiple switches, there exists a need to implement a batching scheme where individual transactions, or parent transactions, are to be processed by multiple switches. The present invention also provides a new and useful way of processing such switch transactions by batching the transactions even when the transactions are bound for multiple switches.

Technology-based industries offer a host of products and services that involve the specific configuration or programming of various computing devices. The logic that is implemented on these computing devices are driven by business requirements. These business requirements change rapidly in response to competition, consumer needs and other such dynamics. An industry that exemplifies these characteristics is the telecommunications industry.

Telecommunications companies offer a wide variety of services to homes, businesses, and other organizations. These services require a wide range of sophisticated computing devices, including communications devices such as switches, routers and a host of other components. Examples of such telecommunications switches include the Telcordia Service Manager, Lucent Autoplex 1000, and the Nortel DMS-250.

Switches typically support and include a number of data tables. The tables are for such things as customer information, routing data, and network architecture information. The number of tables depends upon the type of switch and can vary greatly, for instance, from eight tables for one particular type of switch to more than thirty tables for another particular type of switch.

The ability for a telecommunications company to offer expanded services, upgrades, and to prevent unauthorized use of its networks is dependent upon its ability to quickly and cost-effectively implement business requirements. As described above, if a customer cancels service from a long-distance carrier, that customer's phone number should not be permitted to originate long-distance telephone calls. A billing number can be associated with the originating party's call. The billing number is the primary telephone number used for billing regardless of the number of telephone lines associated with that number. Automatic Number Identification (ANI) provides for the transmission of the billing number of the originating party through the network. ANI information can include the billing number as well as the telephone number of the originating party. ANI transactions allow for the authentication of originating calls. As various fraud schemes develop and other malicious attempts to access a Telecommunications Network without authorization increase so too does the need to process a growing number of ANI transactions. It is feasible that a telecommunications company may need to process an ANI transaction for each call attempting to access its network.

As described above, some current densely populated geographic areas, such as those within the state of New York, already have up to four switches that can service an originating party's call. A specific switch, sometimes called a home-switch, can be designated as the default switch to service an originating party's call request. If, however, the home-switch is sufficiently burdened with other transactions, then a caller's call may be processed by an alternative switch in the caller's region. Accordingly, all four switches must be updated. Thus, there exists a need to more efficiently update multiple switches.

Similarly, ANI transactions may have to take place on each of the four switches each time the originating party attempts to initiate a call. Any of the four switches can become overburdened with transactions to process. Such a switch is said to be in distress. When a switch is distressed, the wait time processing a new transaction can reach unacceptable levels.

Accordingly, there exists a need for a system and method to automatically update multiple switches on a Telecommunications Network based on a single transaction. There also exists a need for optimizing the processing of switch transactions when those transactions may have dependencies on multiple switches.

SUMMARY OF THE INVENTION

The present invention provides an efficient method for processing switch transactions by grouping together transactions into a data file that can be processed by a switch as a single transaction. Transactions dependent upon or bound for multiple switches can be batched by employing the present invention. For example, if a transaction requires updating three target switches, and two of those switches are backlogged, the present invention provides a new and useful way to batch all of the transactions bound for one of the target switches. This batching is possible even though it will require isolating a transaction bound for one switch that requires processing by another backlogged switch. The present invention provides a way of breaking the parent transaction into child transactions, efficiently processing the child truncations, monitoring the status of the child transactions, and sending a response that the parent transaction is complete only when all of the child transactions are also complete.

If a transaction is to be processed by two target switches, it can be received and grouped with other switch transactions also bound for the same switch. All of these transactions are grouped into a data file, which can be processed much more quickly by the switch than if each transaction were received individually. The transaction can then be completed when both target switches are updated.

Grouping, or batching, can take place by determining that the first target switch is backlogged with switch transactions beyond a threshold quantity. This threshold quantity can be virtually any amount, but an amount less than 1,000, such as fifty, is preferred. A determination can be made as to which of the backlogged switch transactions can be grouped into the data file. This process will be more fully explained in reference to a preferred embodiment below.

The transaction can be completed by transmitting the first data file to a batching manager that prepares the transaction of the first switch as well as the other transactions that were batched for processing. A first child transaction can be created from the switch transaction. This first child transaction includes the portion of the switch transaction to be performed by the first target switch. A second child transaction can also be created from the switch transaction. This second child transaction includes the portion of the switch transaction to be performed by the second target switch. A data file for each of the two switches can then be created. Each of the two data files are comprised of a list of commands to be carried out by the respective first and second target switches, including the respective child transactions. Identification markers can be added to each file that identify the child transactions as being a child of the original transaction, or parent transaction. Each switch can then process its respective data file. Processing the transactions as a file greatly reduces the time it would take to otherwise process each transaction in turn. As the files are being processed, the child transaction-markers are preserved so as to be able to identify them as portions of their parent transaction. As each data file is processed, each transaction within the file can be marked completed. The data files can then be sent back to the batching manager. The batching manger will hold the child transaction until all of its sibling transactions are accounted for. Finally, the transaction can be completed when all of the child transactions arrive.

As will be described in greater detail below, an incoming feed of transactions, including a specific switch transaction, can be received. From the specific switch transaction, all switches to be updated can be identified and then all of the identified switches can be updated. The switch transaction can be divided into a plurality of subfiles, each to be processed by a respective switch.

The present invention also reduces the number of transactions necessary to update the multiple switches. A method is provided for automatically updating multiple switches in a Telecommunications Network environment from a single transaction. Data can be appended to the transaction indicating which switches to update. As will be explained below, a region identifier can be added to the transaction. This identifier can be associated with specific switches within the Telecommunications Network. Based on this information, target switches can be identified and the transaction can be sent to the identified target switches. It is understood that the present invention can be applied to almost any number of switches rather than simply two or five.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means, instrumentalities and combinations particularly pointed out in the appended claims.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

The present invention is directed to a system and method for automatically updating multiple switches of a communications network based on a single transaction and to optimizing the processing of switch transactions. The particular embodiments described herein are intended in all respects to be illustrative rather than restrictive. Alternative embodiments will become apparent to those skilled in the art to which the present invention pertains without departing from its scope. Accordingly, the system and method of the present invention will be described with reference to telecommunications. More particularly, the present invention will be described with reference to routing switches and their associated configuration.

It would be understood by those skilled in the art that while the present invention is described with reference to telecommunications switches, the system and method of the present invention is applicable to other applications that require the generating of rows of data or command statements for any type of database. Alternative embodiments will become apparent to those skilled in the art to which the present invention pertains without departing from its scope.

Despite the embodiment described herein, it would be understood by those skilled in the art that the present invention can be implemented in hardware, software, firmware, or a combination thereof.

A Telecommunications Network is typically comprised of several switches. The modern switch has evolved into an electrical or electronic device that opens or closes circuit pathways within a Telecommunications Network. This evolution will undoubtedly continue and the present invention is directed to the switch of today as well as of the future. These switches are difficult to update manually and are prone to becoming backlogged with switch transactions. The present invention will ease the process of updating multiple switches and increase the efficiency of processing switch transactions.

A switch transaction can be any command to update or modify the data within the switch. An update can include, for example, an addition, modification, or deletion of data in a table. The updating process can involve receiving a transaction at a switch that requires the updating of other switches. Also, if a switch is backlogged beyond a threshold number of transactions, a group of transactions are batch processed to increase the efficiency of processing the transactions.

The present invention may be described in the general context of computer-executable instructions, such as program modules, being executed by one or more computing devices in a network environment. Generally a network includes several similar or dissimilar devices connected together by some transport medium, which enables communication between the devices by using a defined protocol. Those skilled in the art will appreciate that the present invention may be practiced within a variety of network configuration environments and on a variety of computing devices, including hand-held devices, consumer electronics, and the like. The invention also may be practiced in a wireless computing environment.

Exemplary Operating Architecture

Figure 1:
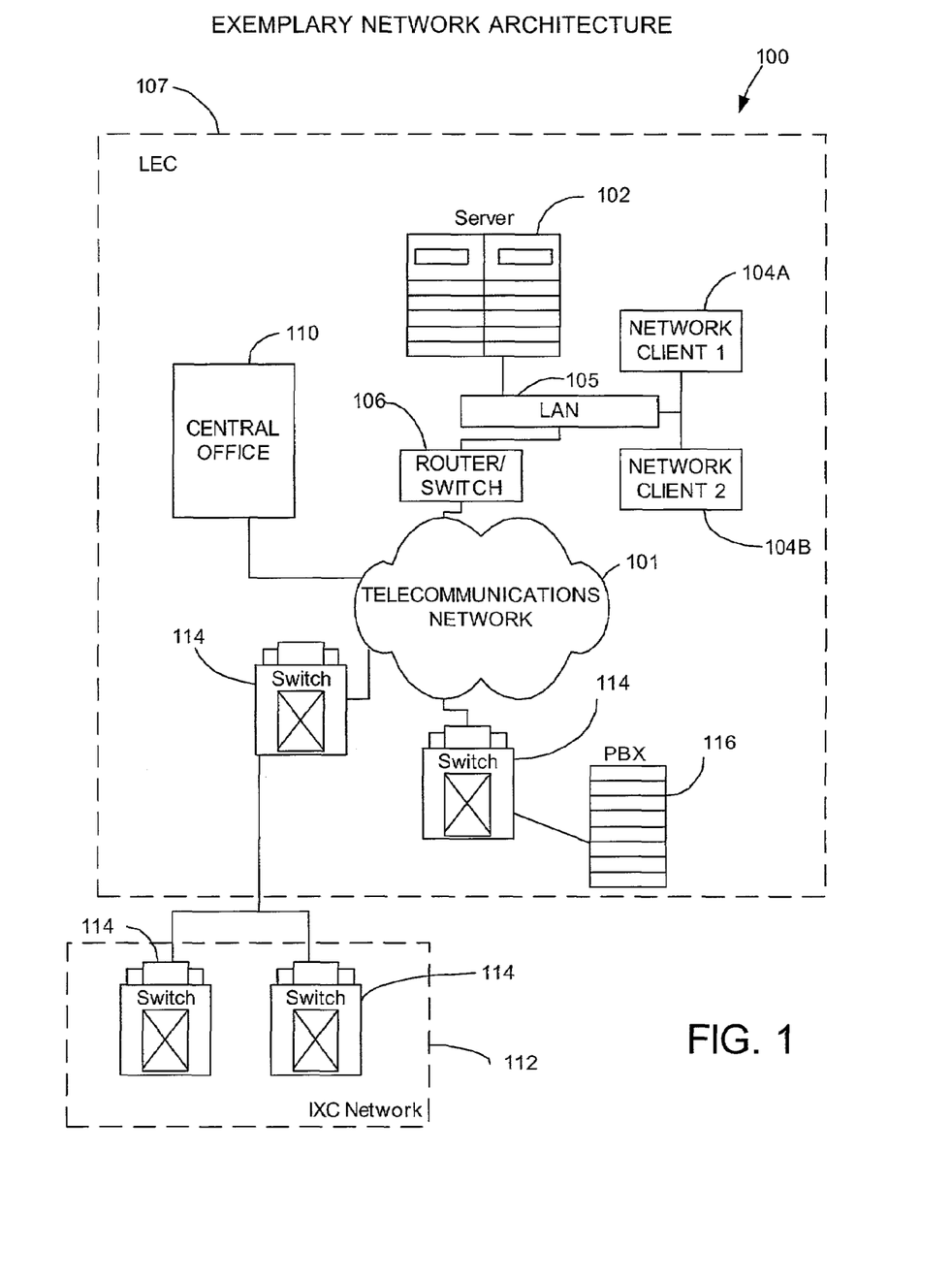
FIG. 1 is a block diagram of an exemplary architecture of a network suitable for practicing the present invention.

Referring to the drawings in general and initially to FIG. 1 in particular, wherein like reference numerals identify like components in the various figures, an exemplary architecture for implementing the present invention is shown and referenced generally by the numeral 100.

The exemplary network architecture 100 is merely one example of a suitable architecture and is not intended to suggest any limitation as to the scope of use or functionality of the invention. Additionally, the network architecture 100 should not be interpreted as having any dependency or requirement relating to any one or combination of components illustrated in FIG. 1.

An exemplary network architecture 100 for implementing the invention includes a Telecommunications Network 101. Telecommunications Network 101 can be public or private, such as the Internet, a Virtual Private Network (VPN) or other such arrangement that enables multiple devices to be locally or remotely interconnected to facilitate communication between them. The Internet is a network of networks that enables one computing system to access virtually any other computing system as well as many databases and different types of information anywhere in the world, so long as the requisite devices have sufficient access to the Internet. A VPN, otherwise referred to as a Software-Defined Network (SDN), typically is used by large-user organizations that have geographically dispersed sites. A terminating location in each of a multisite enterprise is identified and a level of bandwidth required by each is determined. Dedicated access circuits are then established between each point of termination and the closest VPN-capable InterExchange Carrier (IXC) Point Of Presence (POP). This allows the routing of communication traffic over specified high-capacity transmission facilities on a priority basis, thus creating a level of service equivalent to that of a true private network.

The present invention operates with a variety of connected devices in a network environment, as discussed and illustrated in FIG. 1. In an embodiment of the present invention, a server 102, which can be a hosting server or multiple servers, provides a central storehouse or repository for the software programs and data required to provide network-switch configuration and operations. One or more client computers, including a first network client computer 104A and a second network client computer 104B, provide a user interface and may be used to execute portions of the entire program modules of the present invention. First client computer 104A and second client computer 104B are connected to the server 102 by a LAN 105. LAN 105 is in turn logically coupled to the Telecommunications Network 101 through a router/switch 106. The devices on the Telecommunications Network 101 will be described with reference to FIG. 1. Each device may be logically coupled to the Telecommunications Network 101 with a dedicated connection or through some other intermediary method.

A dedicated, or direct access, connection in this context is a connection to a regional or national backbone provider, bypassing any local-service providers. Direct access can be on the basis of a number of alternatives including, but not limited to, Dataphone Digital Service (DDS) and Trunk Carrier (T-Carrier) (e.g., Fractional T1, T1, T3, etc.) service. The connection from the Telecommunications Network 101 to the LAN 105 is linked to a network interface device, such as router/switch 106, which can perform the functions of routing and switching between the Telecommunications Network 101 and the LAN 105. A router is an intelligent device that supports connectivity between like and disparate LANs. Routers also can provide access to various WANs, such as X.25, ISDN and Frame Relay networks. Routers generally provide connectivity, addressing, and switching functions.

Another part of the Telecommunications Network 101 discussed thus far, is the traditional voice network. Voice and data networks have become highly integrated, particularly in light of increasing broadband infrastructures such as the one shown in the network architecture 100, which has components of both. Voice networks are largely circuit-switched networks but can also be packet-switched networks. Shown in FIG. 1, is a typical Local Exchange Carrier (LEC) 107. A LEC 107 provides telephone service, usually within the boundaries of an MSA, state or province. Its primary charter is to provide local voice services through a network of local loops and Central Offices (CO) 110, which can be connected either directly or through a tandem switch to the Telecommunications Network 101. LECs may be connected to networks of Interexchange carriers (IXCs or IECs), designated as an IXC Network 112. Within an IXC network 112, exist Point Of Presence (POP) offices, which are represented by multiple switch 114 instances. Switch 114 can be a variety of switches including a POP office switch or an access tandem switch as intended to reference switches in general. An IXC network 112 provides for long-haul, long-distance connections across Local Access and Transport Area (LATA) boundaries. IXC network 112 is connected to the LEC 107 through a switch 114. LECs also contain a number of Private Branch Exchanges (PBX) 116, which are connected via switch 114 to the Telecommunications Network 101.

Although many other components of the network architecture 100 are not shown, those of ordinary skill in the art will appreciate that such components and the interconnection between them are well known. Accordingly, additional details concerning the construction of the network architecture 100 need not be disclosed in connection with the present invention. The network architecture discussed above provides the infrastructure for the system and method of the present invention. Next, we turn with reference to FIG. 2, to a discussion of an operating environment that could be used to implement the present invention.

Exemplary Operating Environment

The present invention can be implemented in a system comprising a feed handler, coupled to a transaction scheduler, coupled to a switch-command sender, coupled to one or more switches. A batching manager and service-request responder are also logically coupled with the transaction scheduler.

Figure 2:
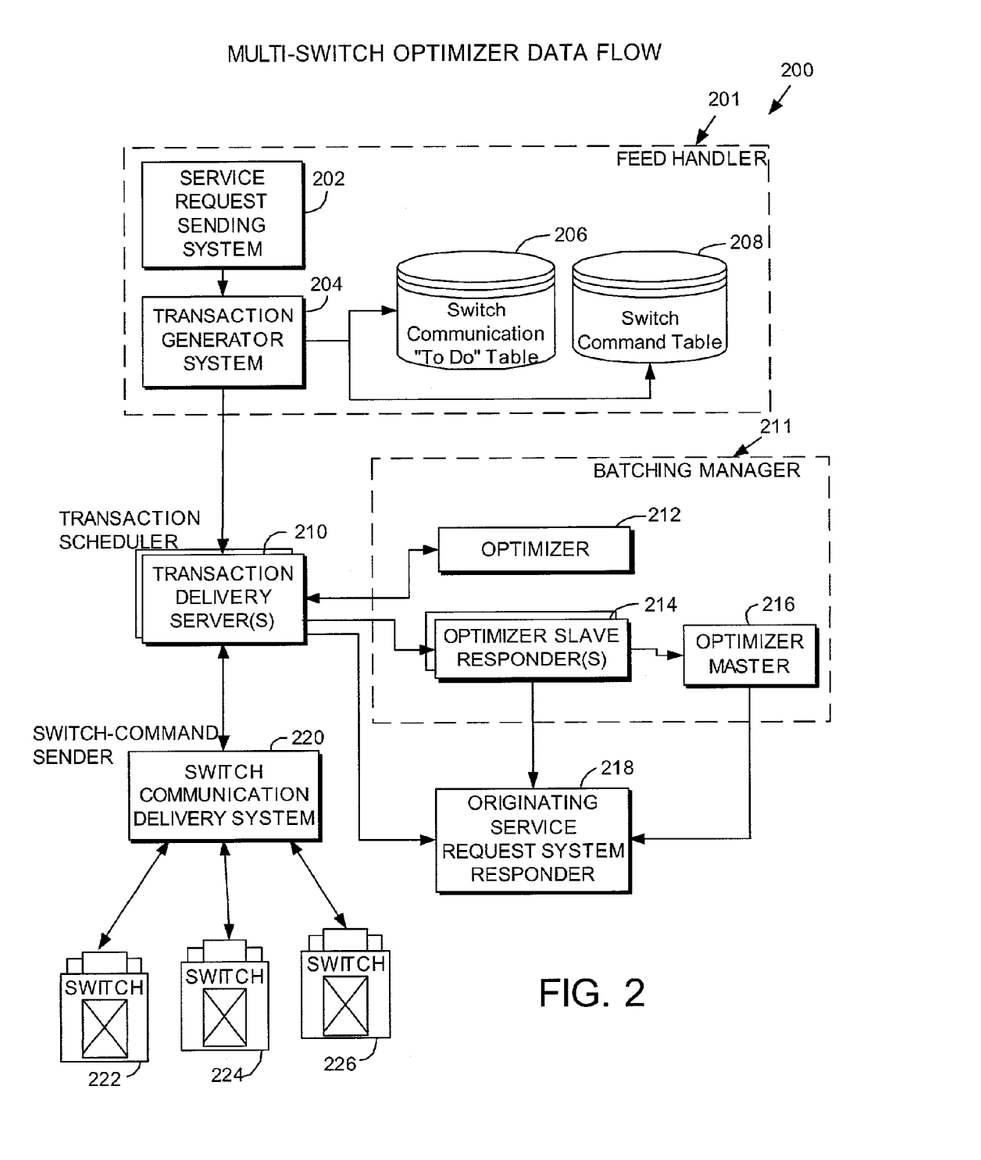
FIG. 2 is block diagram illustrating the components and data flow of the present invention.

Referring to FIG. 2, an exemplary operating environment for implementing the present invention is shown and designated generally as Operating Environment 200. In a basic configuration, Operating Environment 200 includes a Feed Handler 201. A feed handler can be any device or system adapted to accept feeds from various originating systems fed into the Operating Environment 200. A feed can be a data stream. In a preferred embodiment, Feed Handler 201 comprises a Service Request Sending System 202, logically coupled to a Transaction Generator System 204, which is coupled with two tables: a Switch Communication "To Do" Table 206 and a Switch Command Table 208. The Feed Handler 201 is logically coupled to a transaction scheduler. A transaction can be any request that is to be processed by one or more switches. The transaction scheduler can be any device or system that schedules and manages how transactions are to be processed. In a preferred embodiment, the transaction scheduler is a Transaction Delivery Server 210. There can be multiple instances of the Transaction Delivery Server 210, as shown if FIG. 2.

The Transaction Delivery Server 210 is coupled with a Batching Manager 211. The Batching Manager 211 could be a device or system that handles the batching and management of the transactions. This process will be explained in greater detail below and is an aspect of the invention that allows transactions to be processed more efficiently than without batching. For instance, it takes approximately one to three seconds to process a single set of instructions for a transaction. However, it takes approximately fifteen seconds to process a set of instructions for up to 1,000 batched records. Processing time is improved when records are batched into a file and presented to the switch as a single transaction to process. In a preferred embodiment, the batching manager comprises an Optimizer 212, where multiple instances are possible, at least one instance of an Optimizer Slave Responder 214 (a bulk-command response handler), and an Optimizer Master 216.

The Batching Manager 211 is coupled with a responder. Switches execute commands. A switch can build a text message that contains the success/error status of an executed command as well as descriptive information that explains certain results of command executions. Thus an exemplary responder is any device or system where switch-transaction responses are captured in a response file. In a preferred embodiment, the responder is an Originating Service Request System Responder 218. The Originating Service Request System Responder 218 is also logically coupled to the Transaction Delivery Server 210.

The Transaction Delivery Server 210 can be coupled with a switch-command sender. This is a device or system that sends switch-commands. More particularly, the switch-command sender can be any device that sends commands to the switch. In a preferred embodiment, the switch-command sender is a Switch Communication Delivery System 220. The Switch Communication Delivery System 220 can then be coupled to a switch, a group of switches, a network of switches, or a network of networks. A first Switch 222, a second Switch 224, and a third Switch 226 are shown for illustrative purposes.

It is understood and appreciated that various devices may be utilized in the operating environment of the present invention and such variations are contemplated to be within the scope hereof. Many devices, such as the Optimizer 212, could be known by many other names but may still perform a similar function. Such alternative devices are also contemplated within the scope of the present invention.

As will be understood and appreciated by those skilled in the art, while an embodiment of the present invention is described with reference to Telecommunications Network 101 environment, other embodiments utilizing alternative devices and environments are within the scope of the present invention. The present invention may be described in the general context of computer-executable instructions, such as program modules, being executed by a computer. Generally, program modules include routines, programs, objects, components, data structures, and the like, that perform particular tasks or implement particular abstract data types. Moreover, those skilled in the art will appreciate that the present invention is operational with a variety of additional general purpose or special purpose computing systems, environments, and/or configurations. Examples of well-known computing systems, environments, and/or configurations that may be suitable for use with the present invention include, but are not limited to, personal computers, server computers, hand-held or laptop devices, multiprocessor systems, microprocessor-based systems, programmable-consumer electronics, network PCs, minicomputers, mainframe computers, and the like. The invention also may be practiced in distributed-computing environments wherein tasks are performed by remote-processing devices that are linked through a communications network. In a distributed-computing environment, program modules may be located in both local and remote computer storage media including memory storage devices.

Having thus described the architecture and operating environments for the present invention, a process flow illustrating a preferred embodiment for using the architecture of FIG. 2 is now considered. In particular, the process flow depicted is merely one example of a process flow employing the exemplary devises of FIG. 2 that facilitate multiple switches of a Telecommunications Network to be updated automatically based on a single transaction and to increase the efficiency of processing switch transactions.

System and Method for Optimizing Multiple Switches

As generally depicted in FIG. 1, the present invention may be used in a Telecommunications Network 101 among other network environments. The illustrated system of FIG. 2 depicts network devices connected to telecommunications switches such as first, second, and third Switches 222, 224, and 226. Switches provide telecommunications services in a metropolitan statistical area or other geographic area. Each switch supports a plurality of data tables that contain, among other things, call-routing information or data used to route calls serviced by the switch. Two such tables are the Switch Communication "To Do" Table 206 and the Switch Command Table 208, which were earlier identified. It is the Switch Command Table 208 that includes a column to store the data which enables multiple switches to be updated from a single transaction. For example, a region identifier can be included with the transaction whereby the region identifier indicates which switches are to be updated. As will be described below, in a preferred embodiment, a region identifier can be a region code, where a code of '00' indicates a single-switch transaction, '99' indicates a cross-network switch update, and any other value indicates which switches to update. A region identifier can be any data or datum that indicates which switches of a Telecommunications Network 101 are to receive a given transaction.

Figure 3:
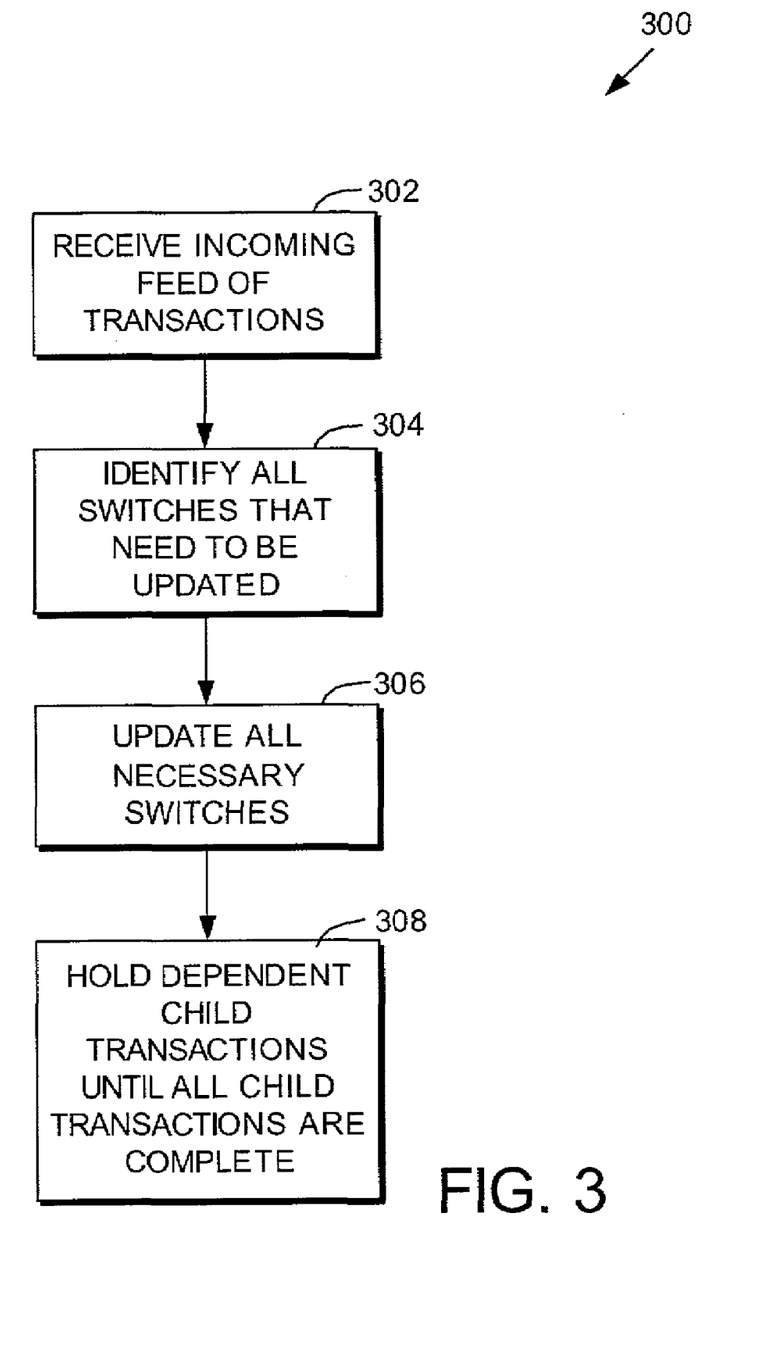
FIG. 3 is a flowchart of the present invention.

An exemplary process for automatically updating information based on a single command, often in the form of data stored in tables of a database in the switches, within multiple switches is provided in FIG. 3 and referenced generally by numeral 300. At a step 302, incoming data feeds are received containing one or more transactions. These transactions could be heading to multiple target switches. Any switches that need to be updated as a result of the transactions are identified at a step 304. Finally, all switches that need to be updated are done so at a step 306 and all dependent transactions are held until all child transactions are complete at a step 308. With the myriad of electronic devices currently available there are many ways that exemplary process 300 can be carried out.

Figure 4A:
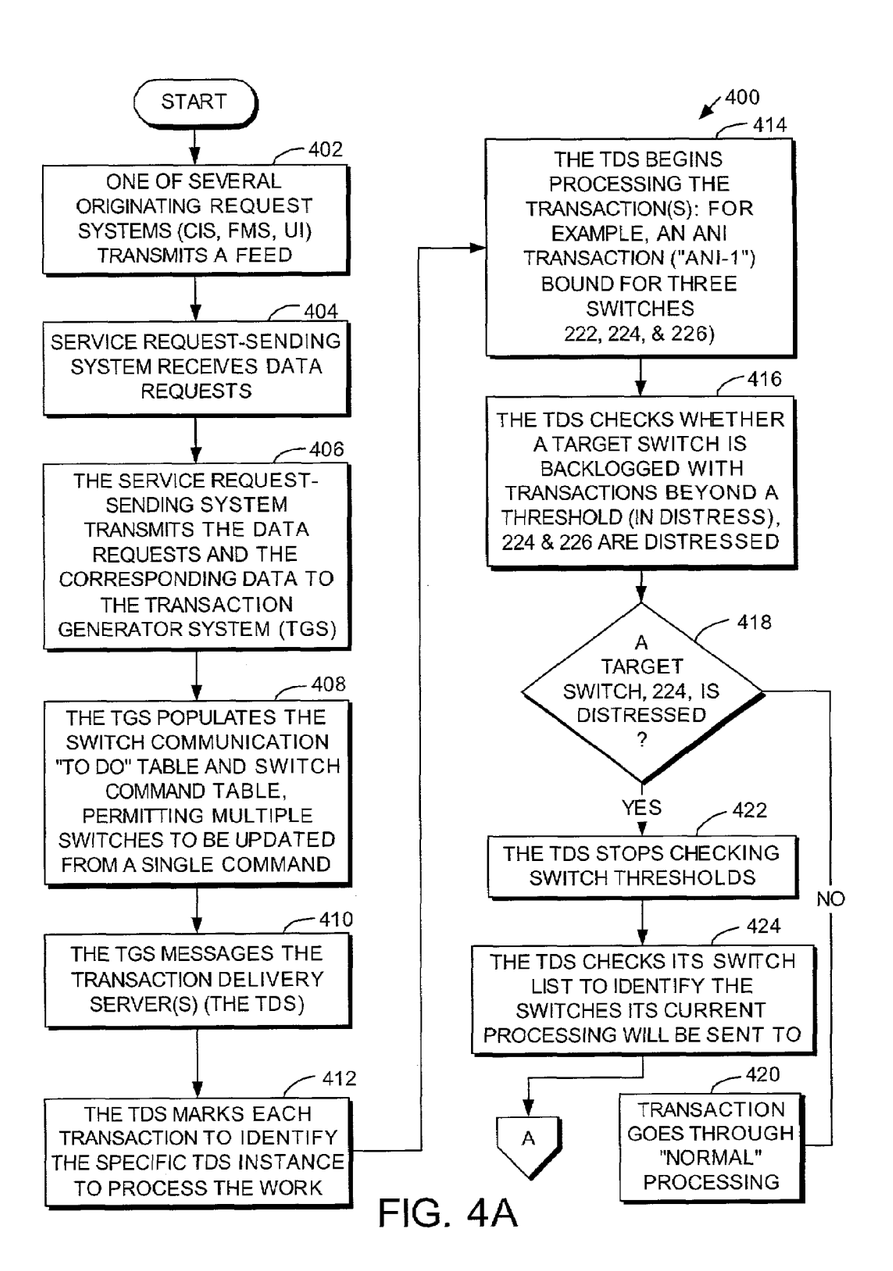
FIGS. 4A through 4E comprise a more detailed flowchart depicting a preferred embodiment of the present invention.

A preferred embodiment of a method for carrying out the present invention is illustrated in FIG. 4A and is referenced generally by numeral 400. FIG. 4A illustrates merely one, detailed process flow of FIG. 3 using the devices of FIG. 2 through the exemplary architecture of FIG. 1. The process of FIG. 4A is merely illustrative and is intended to offer one example of the method and system of the present invention and is not intended to restrict the invention in any way. The process of FIG. 4A describes a transaction that requires updating three switches, such as first Switch 222, second Switch 224, and third Switch 226. A switch can be backlogged, or distressed, when the number of transactions waiting to be processed is beyond some threshold quantity, fifty for example. In this example, first Switch 222 is not distressed, but second and third Switches 224 and 226 are distressed. The exemplary transaction is an Automatic Number Identification (ANI) transaction. As described earlier, an ANI transaction can be used to prevent fraudulent phone calls that originate from an unauthorized party from being passed through the switch. For instance, an unauthorized party may try to initiate a long-distance phone call. This caller may have three possible originating switches. After a switch receives the request, the system may need to update all three switches to block all future calls from the corresponding, unauthorized billing number.

In the following illustrative example, a parent transaction, referred to as "ANI-1" is headed to three Switches, 222, 224, 226. The transaction threshold for second and third Switches 224 and 226 has reached its exemplary threshold quantity of fifty. After one of the target switches is identified as backlogged, all transactions heading to that switch are pulled and batched, even though a pulled transaction may have dependencies on other switches, which will also be handled by the present invention.

One of several originating data-request systems transmits a feed at a step 402. A feed is a data transmission from one system to another. Exemplary originating service-request systems could include a Customer Information System (CIS) or a Facility Management System (FMS). These systems develop the interfaces that are used to feed the ANI transaction, ANI-1 to the long-distance network. ANI-1 could be used to help resolve telephone-fraud situations. The Service Request Sending System 202 receives the data requests at a step 404. Next, the Service Request Sending System 202 transports the data requests and the corresponding data to the Transaction Generator System 204 at a step 406. The Transaction Generator System 204 populates the data for the switch network in the Switch Command Table 208 and the Switch Communication "To Do" Table 206 at a step 408. The Switch Command Table 208 contains instructions for the switch and the Switch Communication "To Do" Table 206 performs transaction scheduling. When the Transaction Generator System 204 receives a transaction, the transaction is checked to see if it is a multiple-switch transaction. This is determined by checking a region-type-code field in a table. If the region type code is '00' then the transaction is a single-switch transaction; a code of '99' indicates that all switches on the network are to be updated; and any other value corresponds to specific switches to update. These non-'00' and non-'99' region codes can be referenced against another table to determine the respective switches to be updated. Once the appropriate switches are determined, an entry in the Switch Command Table 208 for the transaction is made. This entry permits multiple switches to be updated from a single transaction, greatly reducing the time and effort of updating multiple switches on the Telecommunications Network 101. The Transaction Generator System 204 then messages the Transaction Delivery Server(s) 210 at a step 410.

When a transaction comes in from the Transaction Generator System 204 and is destined for multiple switches, that single transaction is broken down into as many sub-transactions, or child transactions, as there are switches that are affected. Thus if twenty switches are affected, then twenty subtransactions are created within the Transaction Delivery Server 210. If fifteen of those switches are not backlogged, those fifteen subtransactions are handled under "normal" processing. As will be explained below, these transactions go straight to the Switch Communication Delivery System 220, and switch responses are sent to Transaction Delivery Server 210.

There can be multiple instances of the Transaction Delivery Server 210, each with a process name that identifies which instantiation of the server will process the work. Thus, the Transaction Delivery Server 210 marks each transaction to identify the specific Transaction Delivery Server 210 instance to process the work at a step 412. Next, the Transaction Delivery Server 210 begins processing ANI-1 bound for first, second and third target Switches 222, 224, and 226 at a step 414. At a step 416, the Transaction Delivery Server 210 checks whether a target switch is backlogged with transactions beyond a threshold. In this example second and third Switches 224 and 226 are distressed. A determination is made whether a target switch, second Switch 224 for example, is distressed at a step 418.

If a target switch is not distressed, the transaction for that switch goes through "normal" processing, that is, without using the optimizer process at a step 420. The Transaction Delivery Server 210 would send the transaction directly to the Switch Communication Delivery System 220, bypassing Optimizer 212. As explained earlier, child transactions created from a parent transaction destined for multiple switches are handled under normal processing when those switches are not backlogged. These transactions go straight to the Switch Communication Delivery System 220, and switch responses are sent to Transaction Delivery Server 210.

If, however, a target switch, such as second Switch 224, is distressed, then the Transaction Delivery Server 210 stops checking other target-switch thresholds at a step 422. The transaction on first Switch 222 is complete, as it was not backlogged. The Transaction Delivery Server 210 checks its switch list to identify the switches its current processing will be sent to at a step 424. A switch list is a dynamic list held in memory for each instantiation of Transaction Delivery Server 210. It contains the list of switches for which there are current transactions headed. A Transaction Delivery Server 210 receives transactions, identifies which switches those transactions are headed to, and builds a list of those affected switches. The Transaction Delivery Server 210 ties transactions to those switches until it is ready to message Optimizer 212. For instance, if transactions are received by an instantiation of Transaction Delivery Server 210 for Switches 222, 224, and 226, a list of those three switches would be created and transactions associated with them. However, first Switch 222 would not be on the switch list because there are no transactions currently headed for that switch in Transaction Delivery Server 210. First Switch 222 was not backlogged. As new transactions are received, the list is continually updated; hence, the dynamic nature of the list.

Figure 4B:
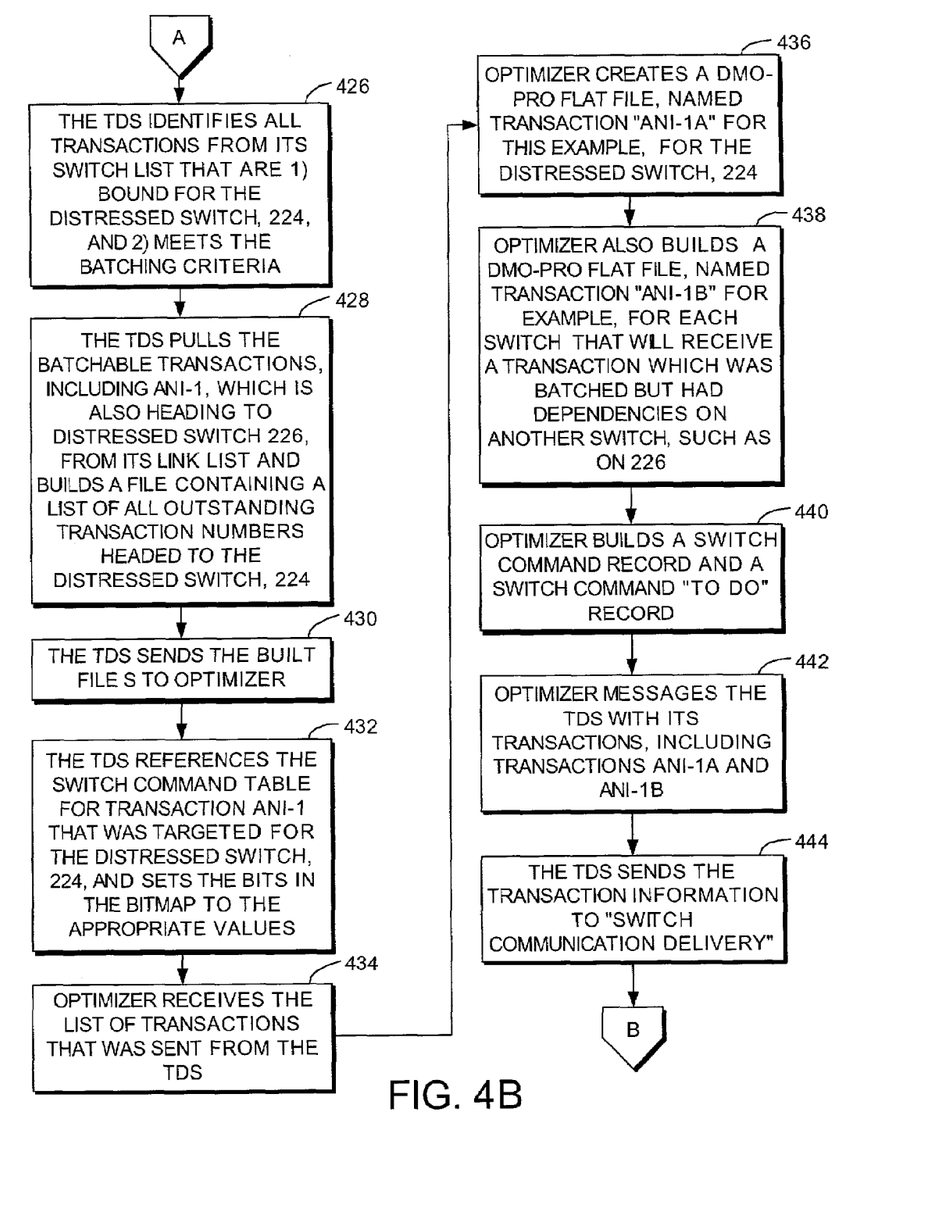

The exemplary process follows with reference to FIG. 4B. The Transaction Delivery Server 210 has stopped checking switch thresholds. The Transaction Delivery Server 210 works though its list of transactions and identifies all those that are going to second Switch 224 which meet the batching criteria. At a step 426, the Transaction Delivery Server 210 identifies all transactions from its switch list that 1) are bound for the distressed switch and 2) meet the batching criteria. The batching criteria can include checking a transaction-type parameter and a transaction flag, which indicates that the transaction headed for second Switch 224 can be batched. At a step 428, the Transaction Delivery Server 210 pulls the batchable transactions, including ANI-1 (which is also heading to another distressed switch, third Switch 226) from its link list and builds a first data file containing a list of all outstanding transaction numbers headed to the distressed switch, second Switch 224. Thus the Transaction Delivery Server 210 has pulled transaction ANI-1 into a first data file, which includes the outstanding child transaction that is headed to distressed Switch 226. The Transaction Delivery Server 210 builds the data file containing the list of transaction numbers and an IPC message. As new transactions continue to come into the Transaction Delivery Server 210, it continues to check transaction thresholds to determine if move switches become backlogged.

The Transaction Delivery Server 210 sends the first data file containing the list of transaction numbers to Optimizer 212 at a step 430. Next, at a step 432, the Transaction Delivery Server 210 references the Switch Command Table 208 for transaction ANI-1 that was targeted for the Distressed Switch 224 and sets the bits in the bitmap to the appropriate values. A bitmap is an array of binary data. A bitmap is used to store more information in a smaller space. Switches in a domestic long-distance network can have a predesignated position in a switch bitmap. That position would set to either zero or to one, with zero indicating that the switch is not included in a certain transaction. A '1' could indicate that the switch is included in the transaction. If there are multiple switches affected, there could be 1s set in the bit position for each affected switch. Turning briefly from the process flow of FIG. 4B, an exemplary bitmap illustration is provided in FIGS. 5A–5O where a first bitmap is referenced by numeral 502.

Figure 5A:
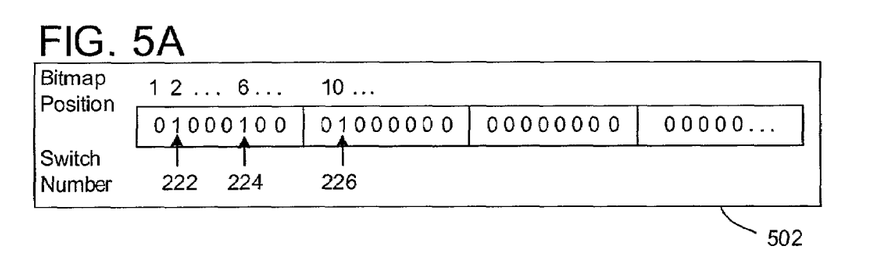
FIG. 5 is a schematic diagram of a series of bitmaps illustrating how a switch's bitmap may change in response to completing components of switch transactions.

Every transaction can have its own switch bitmap. The bitmap can handle many entries, for example 1024 entries. Each switch can be assigned a position in the switch bitmap. The following table illustrates the switch IDs and their corresponding bitmap index for first bitmap 502.

| Switch_ID | BITMAP_Index (position) |
|---|---|
| 222 | 2 |
| 224 | 6 |
| 226 | 10 |

This example contemplates a transaction bound for Switches 222, 224, and 226. Using the table above as a guide, the bit indexes, or positions, for those three switches are 2, 6, and 10 as shown in FIG. 5A. A '0' indicates that the associated switch is not affected by the transaction. A '1' indicates that the transaction is going to that switch.

Figure 5B:
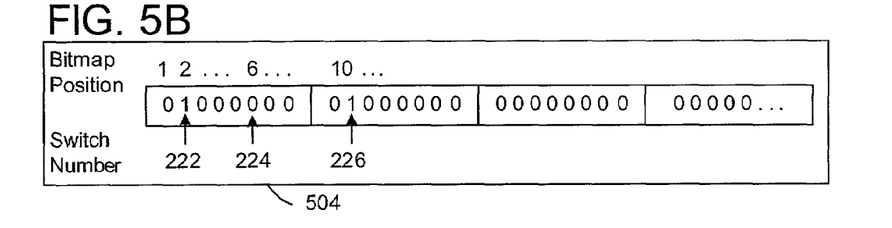
Figure 5C:
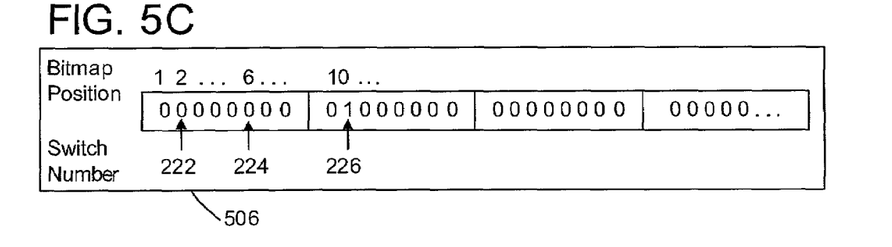
Figure 5D:
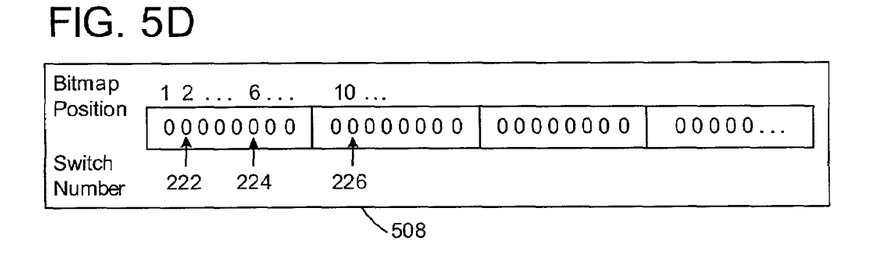

As responses from the three switches are received, first bitmap 502 will be updated to reflect which switches are still outstanding. The order in which the responses are received from the different switches is not important. Graphical representations of changes to the bitmap as responses are received are illustrated in FIGS. 5A–5O. After a response from Switch 224 is received, the bit for position 6, Switch 224, is set to "0" as indicated by numeral 504 in FIG. 5B. After a response from Switch 222 is received, the bit for position 2, Switch 222, is set to "0" as indicated by numeral 506 in FIG. 5C. Finally, after response from Switch 226 is received, the bit for position 10, Switch 226 is set to "0" as indicated by numeral 508 in FIG. 5D. All responses are now in, so the bitmap for this transaction shows all zeros.

Returning now to FIG. 4B, Optimizer 212 receives the list of transactions that was sent from the Transaction Delivery Server 210 at a step 434. Optimizer 212 creates a second data file, a DMO-Pro flat file called transaction ANI-1A, containing a first child transaction of ANI-1. Transaction ANI-1A is not a child transaction. Rather, it is file containing the backlogged transactions, including a child transaction of ANI-1. The child transaction is the portion of transaction ANI-1 that is bound for a single switch, here second Switch 224. DMO-Pro is a Nortel switch batch command software utility. A flat file can be a file containing records that do not have structured interrelationship, for example a textual document. Optimizer 212 also builds a third data file, also a DMO-Pro flat file, named transaction "ANI-1B" in this example, for the transaction headed to third Switch 226. A second child transaction is included within the third data file that was batched but had dependencies on another switch at a step 438. In this exemplary illustration transaction ANI-1 was also dependent on Switch 226. Switch commands to execute the work, close out of the switch, and return to a command-line prompt can be included in each DMO-Pro file. Thereafter, another set of commands can begin.

Next, Optimizer 212 builds a switch command record and a Switch Command "To Do" record at a step 440. The Switch Command "To Do" record can contain scheduling information and transaction statuses. Optimizer 212 then messages the Transaction Delivery Server 210 with its transactions, including transactions ANI-1A and ANI-1B at a step 444. In this example, Optimizer 212 is sending work to the Transaction Delivery Server 210 in a fashion similar to that of the Transaction Generator System 204. Transaction Delivery Server 210 does not need to distinguish from where the incoming work comes. See FIG. 4B, step 444 not referred in text.

Figure 4C:
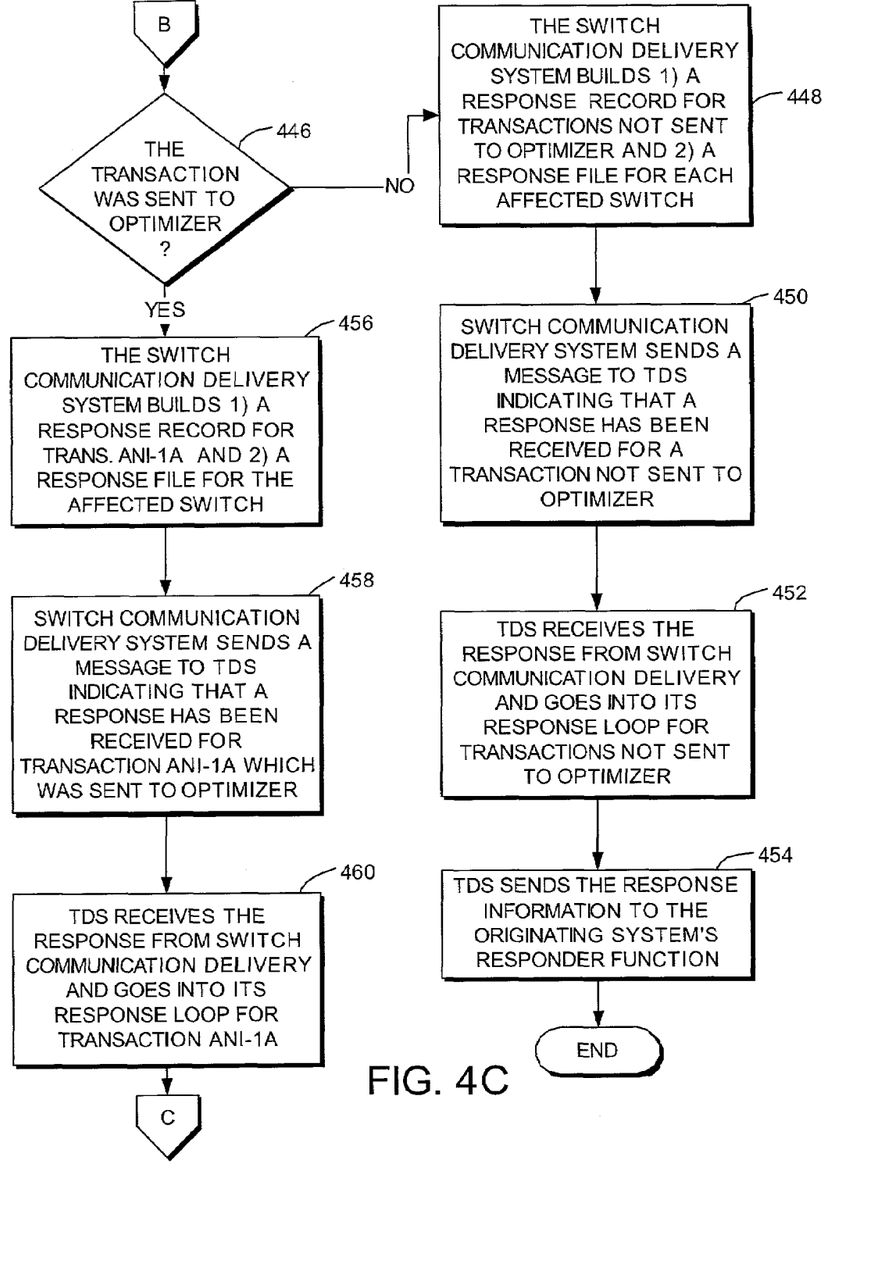

Continuing on to FIG. 4C, the Transaction Delivery Server 210 determines whether the transaction was sent to Optimizer 212 at a step 446. If the transaction was not sent to Optimizer 212, then the Switch Communication Delivery System 220 builds 1) a response record for transactions not sent to optimizer and 2) a response file for each affected switch at a step 448. Then the Switch Communication Delivery System 220 sends a message to the Transaction Delivery Server 210 indicating that a response has been received for the transaction not sent to Optimizer 212 at a step 450. At a step 452, Transaction Delivery Server 210 receives the response from Switch Communication Delivery System 220 and goes into its response loop for transactions not sent to Optimizer 212. Finally, for transactions not sent to Optimizer 212, the Transaction Delivery Server 210 sends the response information to the originating system's responder function, ending the process at a step 454.

If, however, the transaction was sent to Optimizer 212, then, at a step 456 the Switch Communication Delivery System 220 builds 1) a response record for transaction ANI-1A and 2) a response file for the affected switch. This response file can contain the detail on each individual table change request, including parent transaction ANI-1. Next, Switch Communication Delivery System 220 sends a message to the Transaction Delivery Server 210, indicating that a response has been received for transaction ANI-1A, which was sent to optimizer at a step 458. At a step 460, Transaction Delivery Server 210 receives the response from the Switch Communication Delivery System 220 and goes into its response loop for transaction ANI-1A.

Figure 4D:
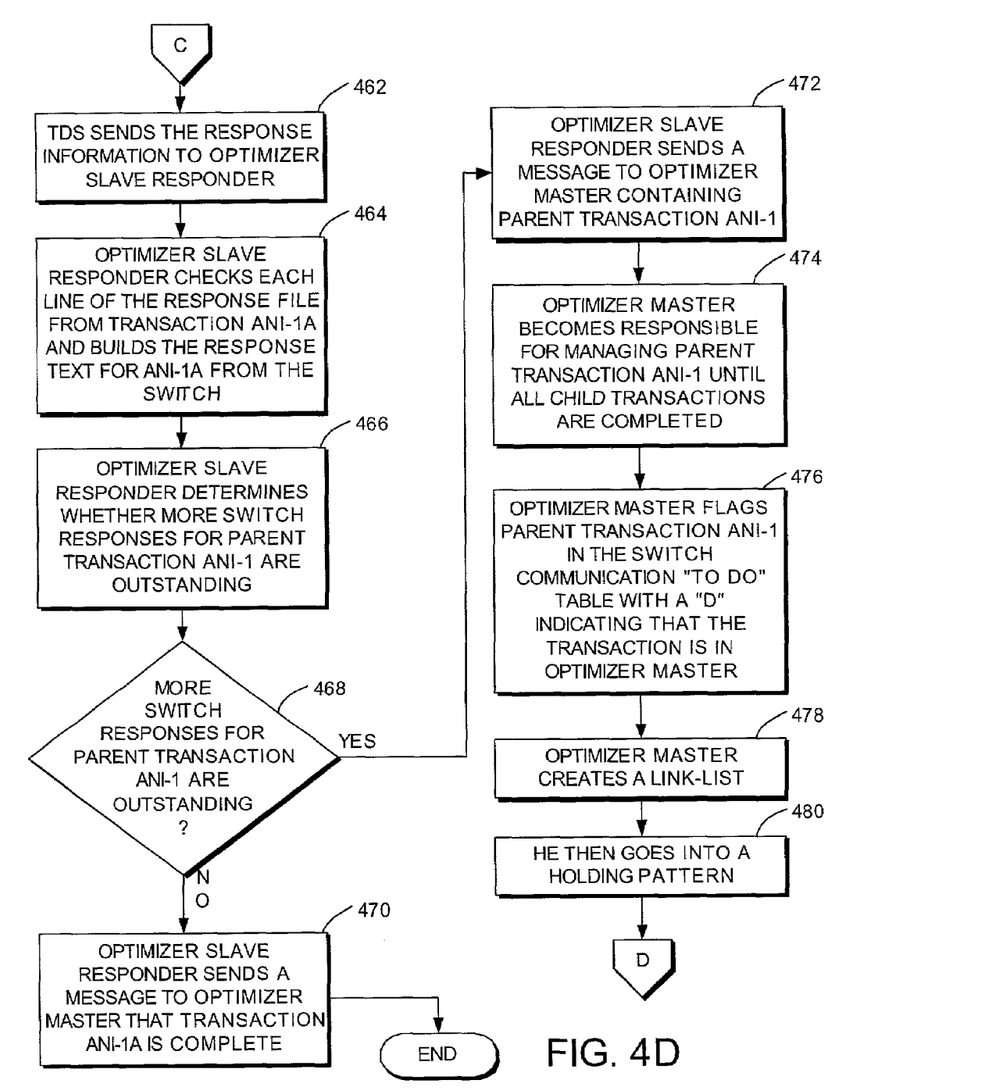

Continuing on to FIG. 4D, the Transaction Delivery Server 210 sends the response information to Optimizer Slave Responder 214 at a step 462. Optimizer Slave Responder 214 checks each line of the response file from transaction ANI-1A and builds the response text for ANI-1A from the switch at a step 464. Optimizer Slave Responder 214 then determines whether more switch responses for parent transaction ANI-1 are outstanding at a step 466. If there are no more switch responses for parent transaction ANI-1, then the process ends at step 470 where Optimizer Slave Responder 214 sends a message to Optimizer Master 216 that transaction ANI-1A is complete.

At a step 468, if there are more switch responses for parent transaction ANI-I outstanding, then Optimizer Slave Responder 214 sends a message to Optimizer Master 216 containing parent transaction ANI-1 at a step 472. Optimizer Master 216 becomes responsible for managing parent transaction ANI-1 until all child transactions are completed at a step 474. Optimizer Master 216 then, at a step 476, flags parent transaction ANI-1 in the Switch Communication "To Do" Table 206 with a "D," indicating that the transaction is in Optimizer Master 216. Optimizer Master 216 then creates a link-list containing the parent transaction ANI-1 and a count of how many outstanding child transactions are still incomplete at a step 478 and goes into a holding pattern at a step 480.

Figure 4E:
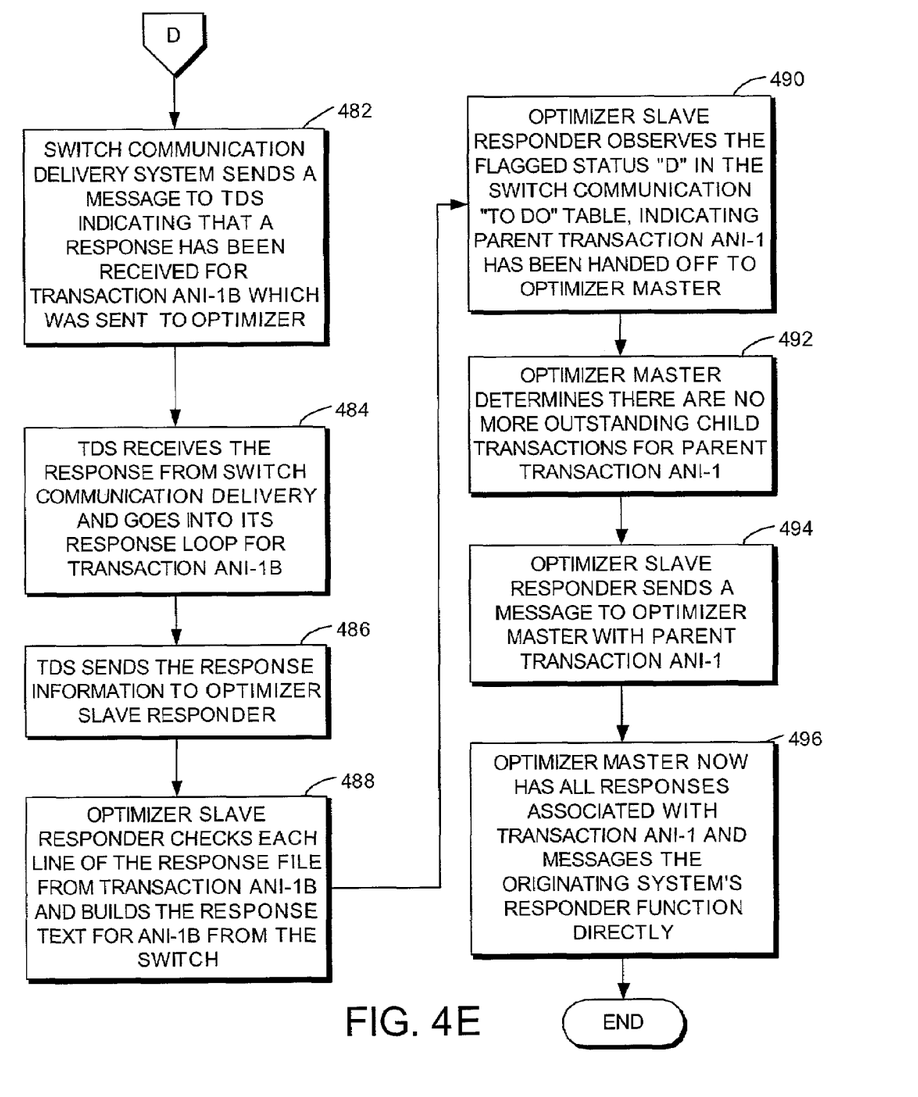

Continuing on to FIG. 4E, the Switch Communication Delivery System 220 sends a message to the Transaction Delivery Server 210 indicating that a response has been received for transaction ANI-1B, which was sent to Optimizer 212 at a step 482. The Transaction Delivery Server 210 then receives the response from the Switch Communication Delivery System 220 and goes into its response loop for transaction ANI-1B at a step 484. Next, the Transaction Delivery Server 210 sends the response information to Optimizer Slave Responder 214 at step 486. Optimizer Slave Responder 214 checks each line of the response file from transaction ANI-1B and builds the response text for ANI-1B from the switch at a step 488. Optimizer Slave Responder 214 observes the flagged status "D" in the Switch Communication "To Do" Table 206, indicating parent transaction ANI-1 has been handed off to Optimizer Master 216 at a step 490. Optimizer Master 216 then determines that there are no more outstanding child transactions for parent transaction ANI-1 at step 492 in this example. Optimizer Slave Responder 214 sends a message to Optimizer Master 216 with parent transaction ANI-1 at a step 494. Finally, Optimizer Master 216 has all responses associated with transaction ANI-1 and messages the originating system's responder function directly at a final step 496.

Having described an embodiment of the present invention, it would be apparent to those skilled in the art, that the system and method of the present invention is highly flexible in its application. For example, although Optimizer was described as processing ANI-type transactions, the system and method's batching function can handle other transaction types. For example, LNP (Local Number Portability) transactions and routing transactions could be processed using Optimizer. Although the preferred switch to use with the Optimizer process is the DMS-250 made by the Nortel Networks Corporation, a Brampton, Ontario, company, the process can also be applied to other switches made by other companies. As would be further understood by those skilled in the art, the Optimizer process can also be used to populate data tables other than those relating to switches, as long as default values and rules for populating the tables can be adequately described and specified.

The system and method of the present invention provides numerous advantages which include but are not limited to, updating multiple switches automatically. A further advantage of the present invention lies in its ability to batch and process switch transactions even when those transactions have dependencies on multiple switches.

The present invention has been described in relation to particular embodiments which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and within the scope of the claims.

What is claimed is:

1. A method for processing a switch transaction for updating multiple switches of a telecommunications network, comprising:
receiving a first switch transaction bound for a first target switch and at least a second target switch;
grouping said first switch transaction with other switch transactions also bound for said first target switch, wherein said grouping of said first switch transaction with the other switch transactions comprises:
determining that said first target switch is backlogged with switch transactions beyond a threshold quantity;

determining which of said backlogged switch transactions can be grouped; and placing said backlogged switch transactions into a first data file; and updating said multiple switches in response to processing said grouped transactions.

2. The method of claim 1, wherein said updating said multiple switches, comprises:

transmitting a first data file to a batching manager for preparing said first switch transaction and said other transactions for processing;

creating a first child transaction from said first switch transaction wherein said first child transaction includes updating said first target switch;

creating a second child transaction from said first switch transaction wherein said second child transaction includes updating said second target switch;

creating a second data file comprising said first child transaction and other transactions bound for said first switch; and creating a third data file comprising said second child transaction and other transactions bound for said second switch.

3. The method of claim 2, further comprising:

inserting a first identification marker into said second data file to identify said first child transaction as a child of said first switch transaction; and inserting a second identification marker into said third data file to identify said second child transaction as a child of said first switch transaction.

4. The method of claim 3, further comprising:

processing said second data file by said first target switch; and processing said third data file by said second target switch.

5. The method of claim 4, further comprising:

preserving said first and second identification markers as said second and third data files are processed by said first target switch;

marking a completion within said second data file of said first child transaction after the processing of said second data file; and marking a completion within said third data file of said second child transaction after the processing of said third data file.

6. The method of claim 5, further comprising:

transmitting said second data file back to said batching manager; and retrieving said completed first child transaction.

7. The method of claim 6, further comprising maintaining said first child transaction until said third data file is received by said batching manager.

8. The method of claim 7, further comprising transmitting said third data file back to said batching manager.

9. The method of claim 8, further comprising:

retrieving said completed second child transaction; and completing said first switch transaction in response to retrieving said completed second child transaction.

10. A system for processing a switch transaction for updating multiple switches of a telecommunications network, comprising:

a transaction-receiving component for receiving a first switch transaction bound for a first target switch and at least a second target switch;

a transaction-grouping component, logically coupled with said transaction-receiving component, for grouping said first switch transaction with other switch transactions also bound for said first target switch, wherein said grouping of said first switch transaction with the other switch transactions comprises:

determining that said first target switch is backlogged with switch transactions beyond a threshold quantity;

determining which of said backlogged switch transactions can be grouped; and placing said backlogged switch transactions into a first data file; and a multiple switch updating component, logically coupled with said transaction-grouping component, for updating said multiple switches in response to processing said grouped transactions.

11. A system for processing a switch transaction for updating multiple switches of a telecommunications network, comprising:

a feed handler to accept an incoming transaction;

a batching manager to group a set of transactions, wherein said batching manager comprises:

an optimizer for generating a plurality of subfiles comprising a plurality of child transactions to be processed by a single switch logically coupled with said transaction scheduler;

an optimizer master for matching said plurality of child transactions to a parent transaction logically coupled with said originating service request system responder; and an optimizer slave responder for creating a response file for each of said plurality of child transactions logically coupled to said transaction scheduler, said originating service request system responder, and to said optimizer master;

a switch-command sender logically coupled to at least one switch;

a transaction scheduler to send a single transaction to a plurality of switches and logically coupled with said feed handler, said batching manager, and said switch-command sender; and an originating service-request system responder logically coupled with said batching manager and said transaction scheduler.

12. The system of claim 11, wherein said feed handler comprises:

a service request sending system for accepting an incoming switch transaction; and a transaction generator logically coupled with said service request sending system for populating a first database table and a second database table wherein said first database table comprises an instruction for said switch and said second database table comprises a transaction scheduling command.

13. Apparatus for processing a switch transaction bound for multiple switches of a telecommunications network, comprising:

means for receiving a first switch transaction bound for a first target switch and at least a second target switch;

means for grouping said first switch transaction with other switch transactions also bound for said first target switch, wherein said grouping of said first switch transaction with the other switch transactions comprises:

determining that said first target switch is backlogged with switch transactions beyond a threshold quantity;

determining which of said backlogged switch transactions can be grouped; and placing said backlogged switch transactions into a first data file; and means for updating said multiple switches in response to processing said grouped transactions.

14. One or more computer-readable media having computer-readable code embodied thereon, said computer-readable medium for processing a switch transaction bound for multiple switches of a telecommunications network, said computer-readable code, comprising:

code for receiving a first switch transaction bound for a first target switch and at least a second target switch;

code for grouping said first switch transaction with other switch transactions also bound for said first target switch, wherein computer code for grouping said first switch transaction with other switch transactions, comprises:

code for determining that said first target switch is backlogged with switch transactions beyond a threshold quantity:

code for determining which of said backlogged switch transactions can be grouped; and code for placing said backlogged switch transactions into a first data file; and code for updating said multiple switches in response to processing said grouped transactions.

15. The computer-readable media of claim 14, wherein computer code for updating said multiple switches, comprises:

code for transmitting said first data file to a batching manager for preparing said first switch transaction and said other transactions for processing;

code for creating a first child transaction from said first switch transaction wherein said first child transaction includes updating said first target switch;

code for creating a second child transaction from said first switch transaction wherein said second child transaction includes updating said second target switch;

code for creating a second data file comprising said first child transaction and other transactions bound for said first switch; and code for creating a third data file comprising said second child transaction and other transactions bound for said second switch.

16. The computer-readable media of claim 15, further comprising:

code for inserting an identification marker into said second data file to identify said first child transaction as a child of said first switch transaction; and code for inserting an identification marker into said third data file to identify said second child transaction as a child of said first switch transaction.

17. The computer-readable media of claim 16, further comprising:

code for processing said second data file by said first target switch; and code for processing said third data file by said second target switch.

18. The computer-readable media of claim 17, further comprising:

code for preserving said first and second identification markers as said second and third data files are processed by said first target switch;

code for marking a completion within said second data file of said first child transaction after the processing of said second data file; and code for marking a completion within said third data file of said second child transaction after the processing of said third data file.

19. The computer-readable media of claim 18, further comprising:

code for transmitting said second data file back to said batching manager; and code for retrieving said completed first child transaction.

20. The computer-readable media of claim 19, further comprising:

code for holding said first child transaction;

code for transmitting said third data file back to said batching manager; and code for completing said first switch transaction in response to retrieving said completed second child transaction.

21. A method for processing a switch transaction for updating multiple switches of a telecommunications network, comprising:

receiving a first switch transaction bound for a first target switch and at least a second target switch;

grouping said first switch transaction with other switch transactions also bound for said first target switch; and updating said multiple switches in response to processing said grouped transactions, wherein said updating said multiple switches, comprises:

transmitting a first data file to a batching manager for preparing said first switch transaction and said other transactions for processing;

creating a first child transaction from said first switch transaction wherein said first child transaction includes updating said first target switch;

creating a second child transaction from said first switch transaction wherein said second child transaction includes updating said second target switch;

creating a second data file comprising said first child transaction and other transactions bound for said first switch; and creating a third data file comprising said second child transaction and other transactions bound for said second switch.

22. One or more computer-readable media having computer-readable code embodied thereon, said computer-readable medium for processing a switch transaction bound for multiple switches of a telecommunications network, said computer-readable code, comprising:

code for receiving a first switch transaction bound for a first target switch and at least a second target switch;

code for grouping said first switch transaction with other switch transactions also bound for said first target switch; and code for updating said multiple switches in response to processing said grouped transactions, wherein computer code for updating said multiple switches, comprises:

code for transmitting said first data file to a batching manager for preparing said first switch transaction and said other transactions for processing;

code for creating a first child transaction from said first switch transaction wherein said first child transaction includes updating said first target switch;

code for creating a second child transaction from said first switch transaction wherein said second child transaction includes updating said second target switch;

code for creating a second data file comprising said first child transaction and other transactions bound for said first switch; and code for creating a third data file comprising said second child transaction and other transactions bound for said second switch.

23. A system for processing a switch transaction for updating multiple switches of a telecommunications network, comprising:

a transaction-receiving component for receiving a first switch transaction bound for a first target switch and at least a second target switch;

a transaction-grouping component, logically coupled with said transaction-receiving component, for grouping said first switch transaction with other switch transactions also bound for said first target switch; and a multiple switch updating component, logically coupled with said transaction-grouping component, for updating said multiple switches in response to processing said grouped transactions, wherein said updating said multiple switches, comprises:

transmitting a first data file to a batching manager for preparing said first switch transaction and said other transactions for processing;

creating a first child transaction from said first switch transaction wherein said first child transaction includes updating said first target switch;

creating a second child transaction from said first switch transaction wherein said second child transaction includes updating said second target switch;

creating a second data file comprising said first child transaction and other transactions bound for said first switch; and creating a third data file comprising said second child transaction and other transactions bound for said second switch.

* * * * *